United States Patent
Lee et al.

(10) Patent No.: US 10,565,744 B2
(45) Date of Patent: Feb. 18, 2020

(54) METHOD AND APPARATUS FOR PROCESSING A MEDICAL IMAGE TO REDUCE MOTION ARTIFACTS

(71) Applicants: Samsung Electronics Co., Ltd., Suwon-si, Gyeonggi-do (KR); KOREA ADVANCED INSTITUTE OF SCIENCE AND TECHNOLOGY, Daejeon (KR)

(72) Inventors: Duhgoon Lee, Yongin-si (KR); Jong Beom Ra, Daejeon (KR); Seungeon Kim, Incheon (KR); Kyoung-yong Lee, Hwaseong-si (KR); Ji-young Choi, Suwon-si (KR); Yongjin Chang, Incheon (KR)

(73) Assignees: Samsung Electronics Co., Ltd., Suwon-si (KR); Korea Advanced Institute of Science and Technology, Daejeon (KR)

( * ) Notice: Subject to any disclaimer, the term of this patent is extended or adjusted under 35 U.S.C. 154(b) by 299 days.

(21) Appl. No.: 15/640,344

(22) Filed: Jun. 30, 2017

(65) Prior Publication Data
US 2018/0005414 A1 Jan. 4, 2018

(30) Foreign Application Priority Data

Jun. 30, 2016 (KR) .................. 10-2016-0082978
Dec. 20, 2016 (KR) .................. 10-2016-0174768

(51) Int. Cl.
*G06T 11/00* (2006.01)

(52) U.S. Cl.
CPC .......... *G06T 11/003* (2013.01); *G06T 11/005* (2013.01); *G06T 2210/41* (2013.01); *G06T 2211/412* (2013.01)

(58) Field of Classification Search
CPC . G06T 11/003; G06T 11/005; G06T 2210/41; G06T 2211/412
See application file for complete search history.

(56) References Cited

U.S. PATENT DOCUMENTS 7,782,998 B2 * 8/2010 Langan ............... G01N 23/046 378/8
2015/0063534 A1 3/2015 Allmendinaer et al.

OTHER PUBLICATIONS

J. Hsieh, Computed Tomography: Principles, Design, Artifacts, and Recent Advances, 2003 :SPIE.
(Continued)

*Primary Examiner* — Siamak Harandi

(57) ABSTRACT

Provided is a medical image processing apparatus including a processor. The processor obtains raw data in a first phase section and generates first motion information by using at least one partial angle reconstruction (PAR) image pair including two PAR images respectively obtained in two phase sections in the first phase section that face each other. The processor also generates a summed image by summing a plurality of PAR images obtained at different phases within the first phase section by using the first motion information. Second motion information is generated by updating the first motion information such that an image metric representing motion artifacts is minimized when being calculated from the summed image and a reconstructed image is generated by applying the second motion information to the raw data.

20 Claims, 8 Drawing Sheets

(56) References Cited

OTHER PUBLICATIONS

S. Halliburton, A. Arbab-Zadeh, D. Dey, A. J. Einstein, R. Gentry, R. T. George, T. Gerber, M. Mahesh, amd W. G. Weigold, "State-of-the-art in CT hardware and scan modes for cardiovascular CT," Journal of Cardiovascular Computed Tomography, 6.3,154-163, 2012.

A. A. Isola, M. Grass, and W. J. Niessen, "Fully automatic nonrigid registration-based local motion estimation for motion-corrected iterative cardiac CT reconstruction," Med. Phys. 37, 1093-1109, 2010.

Q. Tang, J. Cammin, S. Srivastava, and K. Taguchi, "A fully four-dimensional, iterative motion estimation and compensation method for cardiac CT," Med. Phys. 39(7), 4291-4305, 2012.

Q. Tang, J. Cammin, and K. Taguchi, "Four-dimensional projection-based motion estimation and compensation for cardiac x-ray computed tomography," Proc. Fully 3D Conf., 2013.

D. Schafer, J. Borgert, V. Rasche, and M. Grass, "Motion-compensated and gated cone beam filtered back-projection for 3-D rotational X-ray angiography," IEEE Trans. Med. Imag., vol. 25, No. 7, pp. 898-906, 2006.

C. Rohkohl, H. Bruder, K, Stierstorer, and T. Flohr, "Improving best-phase image quality in cardiac CT by motion correction with MAM optimization," Med. Phys. 40(3), 031901 (2013).

J. A. Fessie, M. Sonka and J. M. Fitzpatrick, Eds., "Statistical image reconstruction methods for transmission tomography," in Handbook of Medical Imaging, vol. 2. Medical Image Processing and Analysis. Bellingham: SPIE, 2000, pp. 1-70.

A. R. De Pierro, "A modified expectation maximization algorithm for penalized likelihood estimation in emission tomography", IEEE Trans. Med. Imag., vol. 14, No. 1, pp. 132-137, Mar. 1995.

K. Stierstorfer, A. Rauscher, J. Boese, H. Bruder, S. Schaller, and T. Flohr, "Weighted FBP—A simple approximate 3D FBP algorithm for multislice spiral CT with good dose usage for arbitrary pitch," Phys. Med. Biol., vol. 49, No. 11, pp. 2209-2218, 2004.

S. Bartolac, R. Clackdoyle, F. Noo, J. Siewerdsen, D. Moseley, and D. Jaffray, "A local shift-variant Fourier model and experimental validation of circular cone-beam computed tomography artifacts," Med. Phys., vol. 36, No. 2, pp. 500-512, Feb. 2009.

J. C. Principe, information Theoretic Learning: Renyi's Entropy and Kernel Perspectives. New York: Springer-Verlag, 2010.

W. Segars, G. Sturgeon, S. Mendonca, J. Grimes, and B. M. W. Tsui, "4D XCAT phantom for multimodality imaging research," Med. Phys., vol. 37, No. 9, pp. 4902-4915, 2010.

S. Kim, Y. Chang, and J. B. Ra, "Cardiac motion correction based on partial angle reconstructed images in x-ray CT," Med. Phys., vol. 42, No. 5, pp. 2560-2571, Apr. 2015.

S. Kim, Y. Chang, and J, B, Ra, "Reduction of Cone Angie Effect in Cardiac Motion Correction Based on Partial Angle Reconstructed Images in CT," in Proc. 4th Intl. Mtg. on image formation in X-ray CT, Jul. 2016. [Accepted].

* cited by examiner

METHOD AND APPARATUS FOR PROCESSING A MEDICAL IMAGE TO REDUCE MOTION ARTIFACTS

CROSS-REFERENCE TO RELATED APPLICATION(S) AND CLAIM OF PRIORITY

The present application is related to and claims the benefit of Korean Patent Application No. 10-2016-0082978, filed on Jun. 30, 2016, and Korean Patent Application No. 10-2016-0174768, filed on Dec. 20, 2016, in the Korean Intellectual Property Office, the disclosures of which are incorporated herein in their entirety by reference.

TECHNICAL FIELD

The present disclosure relates to a medical image processing apparatus, a medical image processing method, and a computer-readable recording medium having recorded thereon a computer program code for executing the medical image processing method.

BACKGROUND

X-ray computed tomography (CT) image reconstruction involves obtaining raw data representing a difference between X-ray attenuation degrees of tissues of a human body by projecting X-rays to the human body from the outside in several directions and reconstructing an image of the inside of a human body by using the raw data. X-ray CT image reconstruction may obtain a high-resolution image within a shorter period of time, as compared with other systems used to obtain images of the inside of the human body, such as positron emission tomography (PET), magnetic resonance imaging (MRI), and single photon emission computed tomography (SPECT). However, when a moving object is scanned using an X-ray CT system, motion artifacts occur, and thus the quality of an image is degraded.

SUMMARY

To address the above-discussed deficiencies, it is a primary object to provide medical image processing methods and medical image processing apparatuses that more accurately represent a motion relationship between adjacent times.

Provided are medical image processing methods and medical image processing apparatuses capable of reducing a scan time and increasing a pitch for scanning to thereby obtain an inter-cyclic motion artifact-reduced three-dimensional (3D) image.

Additional aspects will be set forth in part in the description which follows and, in part, will be apparent from the description, or may be learned by practice of the presented embodiments.

According to an aspect of an embodiment, a medical image processing apparatus includes a processor configured to obtain raw data in a first phase section, to generate first motion information by using at least one partial angle reconstruction (PAR) image pair including two PAR images respectively obtained in two phase sections in the first phase section that face each other, to generate a summed image by summing a plurality of PAR images obtained at different phases within the first phase section by using the first motion information, to generate second motion information by updating the first motion information such that an image metric representing motion artifacts is minimized when being calculated from the summed image, and to generate a reconstructed image by applying the second motion information to the raw data.

The processor may be further configured to generate the first motion information by using the at least one PAR image pair having a phase difference of 180°.

The processor may be further configured to update the first motion information such that a difference between pieces of motion information of spatially adjacent control points decreases.

The processor may be further configured to update the first motion information such that motion information at a reference phase is zero.

The processor may be configured to warp rays of the raw data, based on the second motion information, when the reconstructed image is generated.

The first phase section may be a phase section having an angle greater than 180°.

Each of the two phase sections that face each other may have an angle greater than 0° and less than 180°.

The processor may be configured to generate a PAR stack by summing a plurality of PAR images belonging to a same phase, based on a location where a source performs projection, and to generate the first motion information by using a PAR stack pair in the two phase sections that face each other.

The processor may be configured to generate the summed image by compensating for a motion by applying the first motion information to the plurality of PAR images obtained at the different phases and by summing a plurality of motion-compensated PAR images obtained by performing the motion compensation on the plurality of PAR images.

According to another aspect of an embodiment, a medical image processing method includes obtaining raw data in a first phase section; generating first motion information by using at least one partial angle reconstruction (PAR) image pair including two PAR images respectively obtained in two phase sections that face each other in the first phase section; generating a summed image by summing a plurality of PAR images obtained at different phases within the first phase section, and generating second motion information by updating the first motion information such that an image metric representing motion artifacts is minimized when being calculated from the summed image; and generating a reconstructed image by applying the second motion information to the raw data.

According to another aspect of an embodiment, a computer program product includes a non-transitory computer-readable recording medium having recorded thereon computer program codes which, when derived and executed by a processor, perform a medical image processing method. The medical image processing method includes obtaining raw data in a first phase section; generating first motion information by using at least one partial angle reconstruction (PAR) image pair including two PAR images respectively obtained in two phase sections that face each other in the first phase section; generating a summed image by summing a plurality of PAR images obtained at different phases within the first phase section, and generating second motion information by updating the first motion information such that an image metric representing motion artifacts is minimized when being calculated from the summed image; and generating a reconstructed image by applying the second motion information to the raw data.

Before undertaking the DETAILED DESCRIPTION below, it may be advantageous to set forth definitions of certain words and phrases used throughout this patent document: the terms "include" and "comprise," as well as derivatives thereof, mean inclusion without limitation, the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
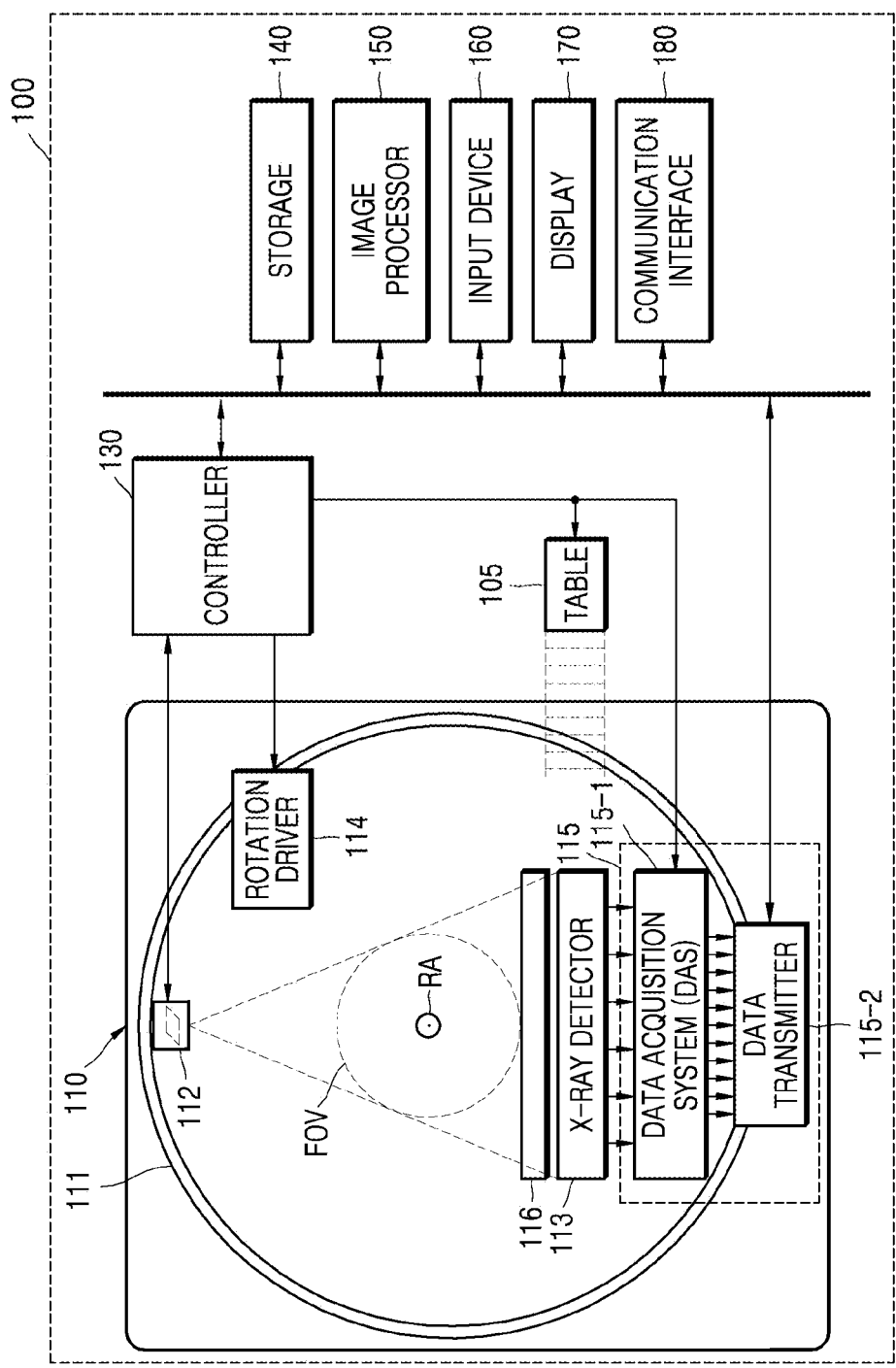
FIG. 1 illustrates a structure of a computed tomography (CT) system according to an embodiment.

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The principle of the present invention is explained and embodiments are disclosed so that the scope of the present invention is clarified and one of ordinary skill in the art to which the present invention pertains implements the present invention. The disclosed embodiments may have various forms.

Throughout the specification, like reference numerals or characters refer to like elements. In the present specification, all elements of embodiments are not explained, but general matters in the technical field of the present invention or redundant matters between embodiments will not be described. Terms 'part' and 'portion' used herein may be implemented using software or hardware, and, according to embodiments, a plurality of 'parts' or 'portions' may be implemented using a single unit or element, or a single 'part' or 'portion' may be implemented using a plurality of units or elements. The operational principle of the present invention and embodiments thereof will now be described more fully with reference to the accompanying drawings.

In the present specification, an image may include a medical image obtained by a medical imaging apparatus, such as a computed tomography (CT) apparatus, a magnetic resonance imaging (MRI) apparatus, an ultrasound imaging apparatus, or an X-ray apparatus.

Throughout the specification, the term 'object' is a thing to be imaged, and may include a human, an animal, or a part of a human or animal. For example, the object may include a part of a body (i.e., an organ), a phantom, or the like.

In the present specification, a 'CT system' or 'CT apparatus' refers to a system or apparatus configured to emit X-rays while rotating around at least one axis relative to an object and photograph the object by detecting the X-rays.

In the specification, a "CT image" refers to an image constructed from raw data obtained by photographing an object by detecting X-rays that are emitted as the CT system or apparatus rotates about at least one axis with respect to the object.

According to embodiments of the present disclosure, a three-dimensional (3D) CT image having reduced motion artifacts may be obtained. First, consecutive partial angle reconstruction (PAR) images are produced using an obtained sinogram. Initial motion estimation is performed to minimize an error of each PAR image pair. Thereafter, a refining term is estimated by performing information potential (IP) maximization on a produced PAR stack, and then a motion-compensated image is reconstructed using an updated motion vector field (MVF).

FIG. 1 illustrates a structure of a CT system 100 according to an embodiment.

The CT system 100 may include a gantry 110, a table 105, a controller 130, a storage 140, an image processor 150, an input interface 160, a display 170, and a communication interface 180.

The gantry 110 may include a rotating frame 111, an X-ray generator 112, an X-ray detector 113, a rotation driver 114, and a readout device 115.

The rotating frame 111 may receive a driving signal from the rotation driver 114 and rotate around a rotation axis (RA).

An anti-scatter grid 116 may be disposed between an object and the X-ray detector 113 and may transmit most of primary radiation and attenuate scattered radiation. The object may be positioned on the table 105 which may move, tilt, or rotate during a CT scan.

The X-ray generator 112 receives a voltage and a current from a high voltage generator (HVG) to generate and emit X-rays.

The CT system 100 may be implemented as a single-source CT system including one X-ray generator 112 and one X-ray detector 113, or as a dual-source CT system including two X-ray generators 112 and two X-ray detectors 113.

The X-ray detector 113 detects radiation that has passed through the object. For example, the X-ray detector 113 may detect radiation by using a scintillator, a photon counting detector, etc.

Methods of driving the X-ray generator 112 and the X-ray detector 113 may vary depending on scan modes used for scanning of the object. The scan modes are classified into an axial scan mode and a helical scan mode, according to a path along which the X-ray detector 113 moves. Furthermore, the scan modes are classified into a prospective mode and a retrospective mode, according to a time interval during which X-rays are emitted.

The controller 130 may control an operation of each of the components of the CT system 100. The controller 130 may include a memory configured to store program codes for performing a function or data and a processor configured to process the program codes or the data. The controller 130 may be implemented in various combinations of at least one memory and at least one processor. The processor may generate or delete a program module according to an operating status of the CT system 100 and process operations of the program module.

The readout device 115 receives a detection signal generated by the X-ray detector 113 and outputs the detection signal to the image processor 150. The readout device 115 may include a data acquisition system (DAS) 115-1 and a data transmitter 115-2. The DAS 115-1 uses at least one amplifying circuit to amplify a signal output from the X-ray detector 113, and outputs the amplified signal. The data transmitter 115-2 uses a circuit such as a multiplexer (MUX) to output the signal amplified in the DAS 115-1 to the image processor 150. According to a slice thickness or a number of slices, only some of a plurality of pieces of data collected by the X-ray detector 113 may be provided to the image processor 150, or the image processor 150 may select only some of the plurality of pieces of data.

The image processor 150 obtains tomography data from a signal obtained by the readout device 115 (e.g., pure data that is data before being processed). The image processor 150 may pre-process the obtained signal, convert the obtained signal into tomography data, and post-process the tomography data. The image processor 150 may perform some or all of the processes described herein, and the type or order of processes performed by the image processor 150 may vary according to embodiments.

The image processor 150 may perform pre-processing, such as a process of correcting sensitivity irregularity between channels, a process of correcting a rapid decrease of signal strength, or a process of correcting signal loss due to an X-ray absorbing material, on the signal obtained by the readout device 115.

According to embodiments, the image processor 150 may perform some or all of the processes for reconstructing a tomography image, to thereby generate the tomography data. According to an embodiment, the tomography data may be in the form of data that has undergone back-projection, or in the form of a tomography image. According to embodiments, additional processing may be performed on the tomography data by an external device such as a server, a medical apparatus, or a portable device.

Raw data is a set of data values corresponding to intensities of X-rays that have passed through the object, and may include projection data or a sinogram. The data that has undergone back-projection is obtained by performing back-projection on the raw data by using information about an angle at which X-rays are emitted. The tomography image is obtained by using image reconstruction techniques including back-projection of the raw data.

The storage 140 is a storage medium for storing control-related data, image data, etc., and may include a volatile or non-volatile storage medium.

The input interface 160 receives control signals, data, etc., from a user. The display 170 may display information indicating an operational status of the CT system 100, medical information, medical image data, etc.

The CT system 100 includes the communication interface 180 and may be connected to external devices, such as a server, a medical apparatus, and a portable device (smartphone, tablet personal computer (PC), wearable device, etc.), via the communication interface 180.

The communication interface 180 may include one or more components that enable communication with an external device. For example, the communication interface 180 may include a short distance communication module, a wired communication module, and a wireless communication module.

The communication interface 180 may receive control signals and data from an external device and transmit the received control signals to the controller 130 so that the controller 130 may control the CT system 100 according to the received control signals.

Alternatively, by transmitting a control signal to an external device via the communication interface 180, the controller 130 may control the external device according to the control signal.

For example, the external device may process data according to a control signal received from the controller 130 via the communication interface 180.

A program for controlling the CT system 100 may be installed on the external device and may include instructions for performing some or all of the operations of the controller 130.

The program may be preinstalled on the external device, or a user of the external device may download the program from a server that provides an application for installation. The server that provides an application may include a recording medium having the program recorded thereon.

According to embodiments, the CT system 100 may or may not use contrast media during a CT scan, and may be implemented as a device connected to other equipment.

Medical imaging apparatuses according to embodiments obtain raw data by imaging an object, and thus generate a reconstructed CT image from the raw data. A medical imaging apparatus according to an embodiment may be implemented as the CT system 100 of FIG. 1.

When an X-ray CT photographs a moving object, for example, a heart that repeats contraction and relaxation quickly, the X-ray CT may obtain a motion artifact-reduced CT image by tuning with an electrocardiogram (ECG) image. For example, the X-ray CT may be used in a coronary artery stenosis evaluation, a graft vessel evaluation after a coronary artery bypass surgery, and a restenosis evaluation after a coronary artery stent surgery, and may also be useful in differentiation of acute chest pain in an emergency room and also in a screening inspection for coronary artery stenosis in a patient at high risk of coronary artery disease.

However, because a temporal resolution of the X-ray CT is still insufficient to photograph a heart, image blur or motion artifacts may occur due to a heart movement during heart imaging of people with fast heartbeats or arrhythmia patients, and accordingly the shape and thickness of a coronary artery may not be properly distinguished, leading to an incorrect diagnosis.

As hardware-based approaches for increasing the temporal resolution, a method of increasing a physical rotation speed of a gantry, a dual-source method, or the like may be used. A dual-source system may have a temporal resolution that is twice a temporal resolution of a single-source system. However, a method, such as, increasing a rotation speed by using hardware or installing additional equipment in a system, may have a physical limit to the level of improvement it can provide, and may increases costs due to an increase in hardware complexity.

According to another method, a motion may be compensated for by extracting motion information from an image or extracting motion information from raw data, such as a sinogram. Embodiments of the present disclosure address degradation of image quality by extracting motion information from PAR images and including a motion model in an image reconstruction process.

According to embodiments, in a four-dimensional (4D) heart motion estimation and compensation method based on PAR images, a motion is estimated and compensated for such that a difference between a plurality of conjugate PAR image pairs decreases. A conjugate PAR image pair means a PAR image pair reconstructed from raw data respectively obtained in angular sections having a relationship of conjugate angles, for example, raw data respectively obtained in two angular sections having a phase difference of 180°. Furthermore, according to embodiments, provided are a method and an apparatus for reconstructing a tomography image capable of more accurately representing a motion relationship between adjacent times by additionally refining a motion model, based on IP.

According to embodiments, an image may be obtained within a short period of time by increasing a pitch for scanning an object. To scan a moving object, for example, a heart, a low pitch helical scan may be performed, or a step and shoot method may be used. However, according to the low pitch helical scan or the step and shoot method, a scan time and a scan dose may be excessively increased in consideration of a movement period and the like of the moving object, and, because multiple cycles of scanning of the moving object are performed, inter-cycle movement may inevitably occur. According to embodiments, provided are an apparatus and a method of obtaining a motion artifact-reduced 3D image in a standard pitch helical scan situation. A medical image processing apparatus according to embodiments may obtain raw data and a reconstructed image within a short period of time by increasing the pitch of a gantry. According to embodiments, occurrence of inter-cycle motion artifacts when the entire object, for example, a heart, is scanned and imaged at a low pitch may be prevented. According to embodiments, a motion of the entire region of an image may be estimated or compensated for in a standard pitch helical scan environment.

According to embodiments, when a high pitch is used, image reconstruction is possible by using only raw data of a single cycle, and thus a motion of a heart may be compensated for even when the motion phases of the heart in different cycles do not match, and maintaining the same breathing state between cycles is not necessary.

The temporal resolution of the X-ray CT may be increased by using the above-described ECG tuning image reconstruction method or, for example, by a method of increasing the performance of basic hardware or increasing the number of sources. However, the improvement in hardware has a physical limit and increases costs due to an increase in hardware complexity. Thus, according to embodiments, an apparatus and a method for algorithmically decreasing the occurrence of motion artifacts are provided.

According to an embodiment of the present disclosure, a metric for measuring the degree of motion artifacts in an image may be defined, and then a motion model may be estimated based on an optimization method such that motion artifacts of a motion-compensated reconstructed image decrease. The present embodiment is useful in estimating a motion model of a region of interest having movement within a heart, such as coronary arteries, heart muscles, or valves.

An example of motion compensation may be motion estimation and motion compensation performed using raw data, such as a sinogram. Because a sinogram is a set of projection images obtained at one moment, a sinogram generally has a better temporal resolution than a reconstructed image. Accordingly, when a motion of an object is extracted from a sinogram, the influence of motion artifacts and the like may be greatly reduced compared to when a reconstructed image is used, and the motion may be estimated in this state. However, because an algorithm using a sinogram estimates a motion based on an image in which the object is projected in one direction, pieces of motion information in directions of ray projection are accumulated in a linear integral model and thus are disappeared. Thus, the algorithm using a sinogram has difficulty in estimating accurate motion information. When motion estimation is performed using a dual-source system, two projection images are simultaneously obtained from two sources at an angle of about 90°, and thus invisible portions in the two images may complement each other. However, in a general single-source system, the accuracy of motion information in a direction of ray projection may be lower than that of motion information in a direction perpendicular to the direction of ray projection, and a large number of calculations are performed because an optimization technique for extracting motion information from all sinograms is used.

According to embodiments, a method and an apparatus for estimating and compensating for a 4D motion of a heart in a low-pitch helical scan situation is provided, and a method and an apparatus for reconstructing a single motion artifact-reduced 3D image of the entire heart in a standard-pitch helical scan situation is provided.

Figure 2:
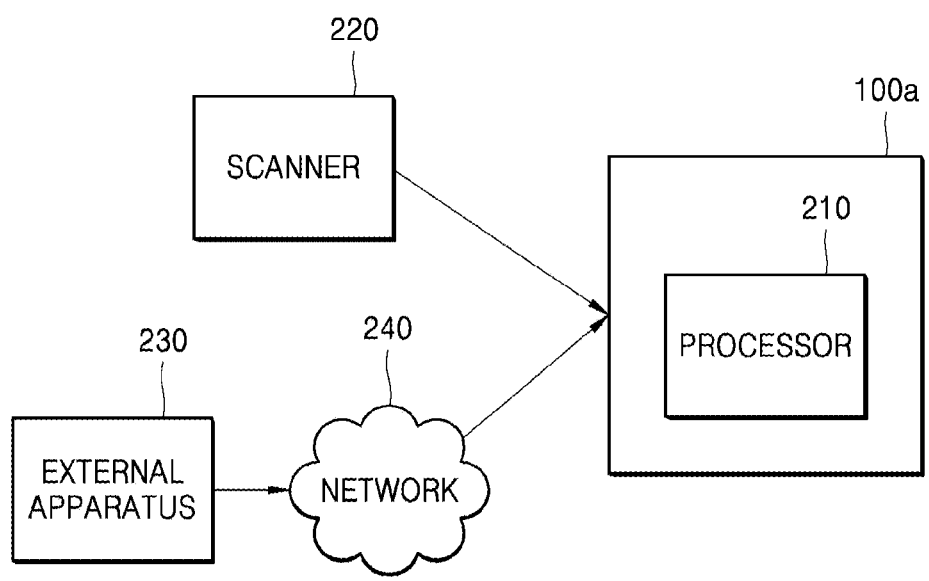
FIG. 2 illustrates a medical image processing apparatus according to an embodiment, and external apparatuses.

FIG. 2 illustrates a medical image processing apparatus 100a according to an embodiment, and external apparatuses.

The medical image processing apparatus 100a includes at least one processor 210.

According to an embodiment, the processor 210 may obtain raw data by scanning an object via a scanner 220. The scanner 220 may include the X-ray generator 112, the X-ray detector 113, and the readout device 115. In order to scan the object and obtain the raw data, the scanner 220 may be controlled by the controller 130 separate from the processor 210 of medical image processing apparatus 100a or by the processor 210 of the medical image processing apparatus 100a. According to an embodiment, the scanner 220 is included in the medical image processing apparatus 100a. According to another embodiment, the scanner 220 may be separate from the medical image processing apparatus 100a, and may transmit the raw data to the processor 210 via a wired or wireless input/output (I/O) device or a communication device.

According to another embodiment, the processor 210 may obtain raw data from an external apparatus 230 connected thereto via a network 240. The external apparatus 230 may be, for example, a server that stores medical image data, another medical imaging apparatus, a user terminal, or an external storage. The network 240 includes various types of wire/wireless networks, for example, a wire/wireless local area network (LAN), a mobile network, and the Internet.

The raw data is, for example, a sinogram including phase information, or projection data.

Figure 3:
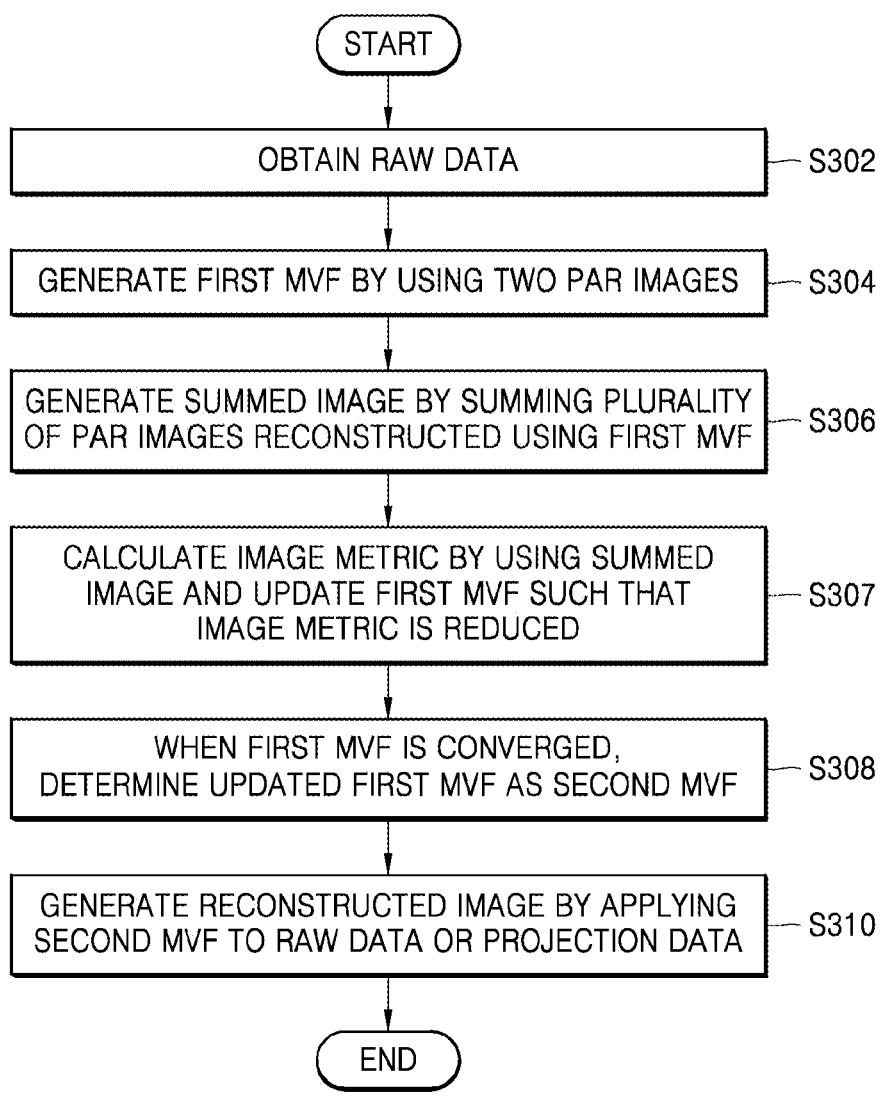
FIG. 3 illustrates a medical image processing method according to an embodiment.

FIG. 3 illustrates a medical image processing method according to an embodiment. An operation of the processor 210 will now be described with reference to the flowchart of FIG. 3. A medical image processing method according to the present disclosure may be performed by various electronic devices including at least one memory and at least one processor. A medical image processing method according to an embodiment, which is performed by the medical image processing apparatus 100a of FIG. 2, will now be described.

In operation S302, the processor 210 obtains raw data by scanning an object. The raw data may be obtained by various methods. For example, the raw data may be obtained from a scanner of the medical image processing apparatus 100a or received from an external apparatus. The processor 210 obtains raw data in a first phase section. The first phase section is a phase section that is greater than 180°, and may be set to be, for example, 360° or 720°.

Next, in operation S304, the processor 210 reconstructs at least one PAR image pair from the raw data and generates first motion information by using two reconstructed PAR images. The first motion information may be represented as, for example, an MVF. Although an embodiment in which motion information is represented as an MVF will be focused on in the present specification, the motion information may be represented as any of various forms other than the MVF. A PAR image pair includes two PAR images reconstructed using raw data in an angular section that is greater than 0° and less than 180°, namely, two PAR images respectively corresponding to two angular sections that face each other. The two angular sections that face each other may be, for example, angular sections having a phase difference of 180° therebetween. The processor 210 may generate the first MVF by using a pair of PAR images or by using a plurality of PAR image pairs.

In operation S306, the processor 210 generates a summed image by summing a plurality of PAR images having different phases and reconstructed using the first MVF. According to an embodiment, the processor 210 generates, from the raw data, a PAR sequence including a plurality of PAR images that cover a phase section that is greater than 180°, and generates the first MVF by using the PAR images included in the PAR sequence, thereby generating the summed image. For example, the PAR sequence may cover a phase section of 360° or a phase section of 360° or greater.

Next, in operation S307, by using the summed image, the processor 210 calculates an image metric that represents motion artifacts. For example, the processor 210 may calculate the image metric, based on a histogram of the summed image. The image metric is a value that quantitatively represents motion artifacts of the raw data. The processor 210 may update the first MVF such that the image metric is reduced, in operation S307, and may iteratively perform the generation of the summed image and the calculation of the image metric by using the updated first MVF.

Next, in operation S308, when the first MVF is converged, the processor 210 determines the updated first MVF as being a second MVF. The first MVF being converged means that the image metric is converged.

In operation S310, when the second MVF is determined, the processor 210 generates a reconstructed image by applying second motion information, namely, the second MVF, to the raw data, for example, a sinogram or projection data. For example, the processor 210 may generate a motion-compensated reconstructed image by warping rays of a sinogram based on the second MVF during reconstruction.

According to an embodiment, the first MVF and the second MVF are 3D MVFs. According to an embodiment, the first MVF and the second MVF may have motion vector components according to phases.

A 4D motion estimation and compensation algorithm for a low-pitch helical scan according to an embodiment will be described.

Figure 4:
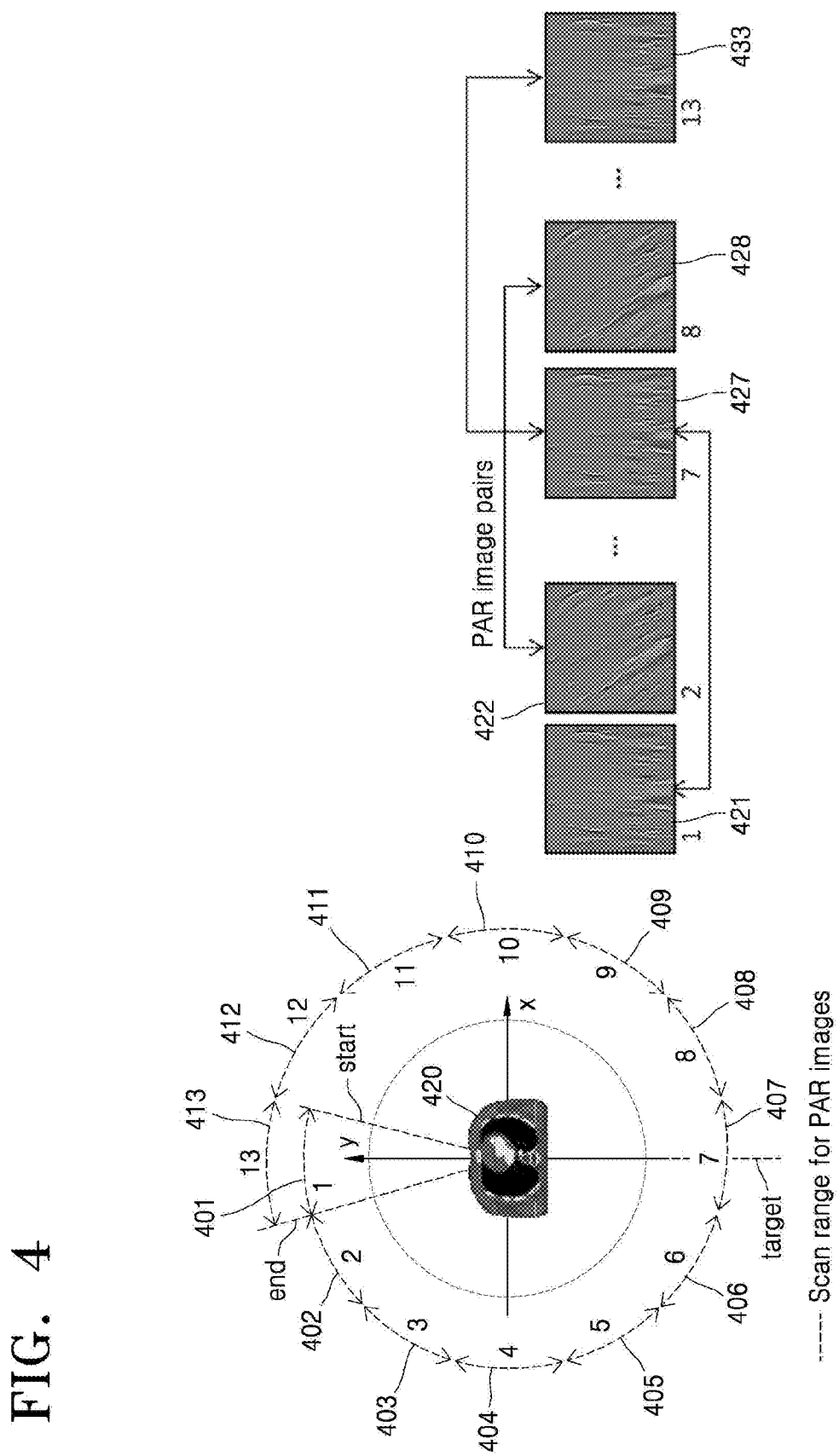
FIG. 4 illustrates a process of generating a first motion vector field (MVF), according to an embodiment.

FIG. 4 illustrates a process of generating the first MVF, according to an embodiment.

In a 4D heart motion estimation and compensation algorithm according to an embodiment, the processor 210 generates a PAR stack by referring to an obtained sinogram and an obtained ECG signal, before estimating a motion. The processor 210 performs initial motion estimation to minimize an error occurring between conjugate PAR images in each conjugate PAR stack. Thereafter, the processor 210 estimates a refining term so that when PAR stacks at consecutive time points are summed based on the first MVF, the summed PAR stacks become a complete image. Finally, the processor 210 performs motion-compensated image reconstruction by using the second MVF estimated by updating the first MVF.

First, generation of a PAR image will be described.

The processor 210 generates a PAR sequence as shown in FIG. 4, by using projection data in a short scan section to perform motion estimation. For example, the X-ray generator 112 rotates while sequentially passing through angular sections 401 through 413 of FIG. 4 and projects X-rays to an object 420, and raw data is generated from X-rays detected by the X-ray detector 113. According to an embodiment, an angle range for scanning is greater than 180°. For example, the angle range for scanning may be 360° or greater. The processor 210 generates, from the raw data, PAR images 421-433 respectively corresponding to the angular sections 401-413. PAR images having a phase difference of 180° therebetween, from among the PAR images 421-433, form a conjugate PAR image pair. For example, the PAR image 421 and the PAR image 427 may form a conjugate PAR image pair, and the PAR image 422 and the PAR image 428 may form a conjugate PAR image pair.

According to the present embodiment, because a data obtainment condition is a low-pitch helical scan, several PAR images are generated for the same phase. To increase the efficiency of calculation, the processor 210 creates a PAR stack by stacking several PAR images belonging to the same phase, in accordance with a location where a source (for example, the X-ray generator 112) performs projection. Each PAR stack reflects motion information of an object at a phase corresponding to the PAR stack with a high temporal resolution, but shows only a partial structure of the object. Accordingly, motion estimation via a direct comparison between PAR stacks of adjacent phases is difficult, but motion estimation via a direct comparison between PAR stacks having a phase difference of 180° therebetween is possible.

Figure 5:
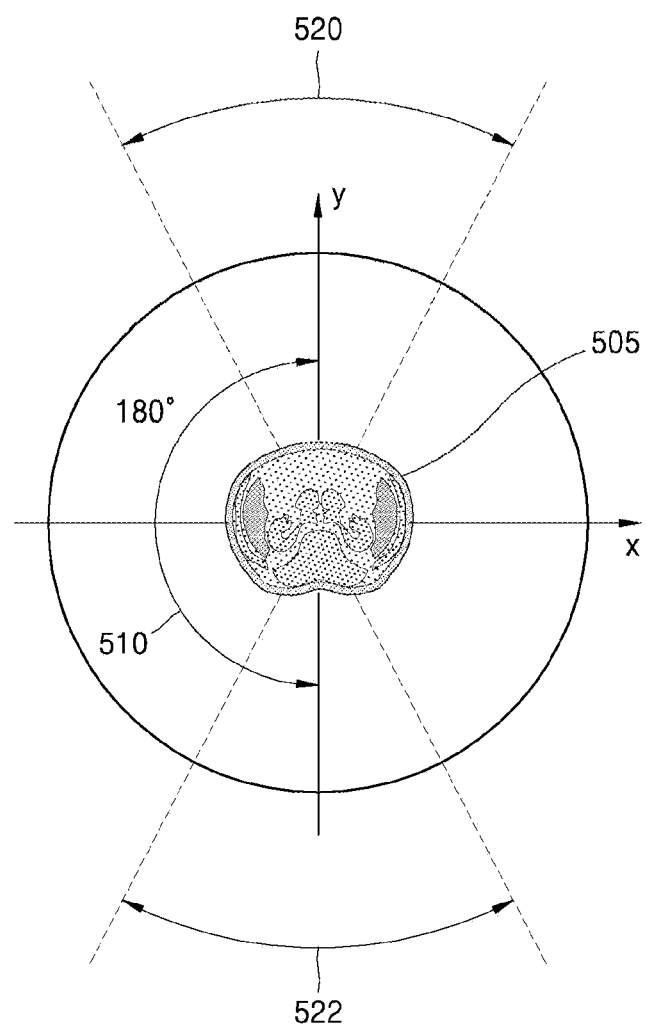
FIG. 5 illustrates a view for explaining a method of obtaining motion information, according to an embodiment.

FIG. 5 illustrates a view for explaining a method of obtaining motion information, according to an embodiment.

According to an embodiment, the processor 210 obtains motion information, namely, an MVF, by using at least one PAR image pair including a first PAR image and a second PAR image at conjugate angles that are angles facing each other. According to an embodiment, the first PAR image and the second PAR image are images having an angle difference of 180° on a rotation path of the X-ray generator 112. The first PAR image and the second PAR image may be tomography images of slices corresponding to the same z-axis position within an error range of the object. The number of PAR images that are used to generate a first MVF may vary according to embodiments.

Referring to FIG. 5, a first angular section 520 and a second angular section 522 may face each other and may be conjugate angles. An angle difference between two angular sections having a conjugate-angle relationship is 180°. For example, the angular section 401 of FIG. 4 may be the first angular section 520, and the angular section 407 of FIG. 4 may be the second angular section 522. The angular section 402 of FIG. 4 may be the first angular section 520, and the angular section 408 of FIG. 4 may be the second angular section 522. Since the X-ray generator 112 rotates around an object at a predetermined speed, the first PAR image and the second PAR image respectively reconstructed in the first angular section 520 and the second angular section 522 have a time difference due to an angle difference 510 of 180°.

Once the first angular section 520 and the second angular section 522 have a conjugate-angle relationship, since views from the first angular section 520 and the second angular section 522 are the same, a surface of an object 505 detected when the object 505 is imaged in the first angular section 520 and a surface of the object 505 detected when the object 505 is imaged in the second angular section 522 are the same. Accordingly, since the first PAR image in the first angular section 520 and the second PAR image in the second angular section 522 express states of the same surface of the object 505 at different times, motion information of the object during a time difference due to the angle difference 510 of 180° may be obtained by comparing the first PAR image with the second PAR image.

According to an embodiment, when the first angular section 520 and the second angular section 522 have values greater than 0° and less than 180°, the processor 210 reconstructs the first PAR image and the second PAR image from raw data obtained in the first angular section 520 and the second angular section 522 by using a PAR method. The PAR images reconstructed by using the PAR method may be an incomplete image or a partial image. According to the present embodiment, since an image is reconstructed by using a relatively small angular section, unlike in a half reconstruction method or a full reconstruction method, a temporal resolution may be increased and motion artifacts may be minimized. Since the amount of motion of the object is measured by using the first PAR image and the second PAR image that are partial angle images in the present embodiment, the amount of motion of the object may be more accurately measured.

Figure 6:
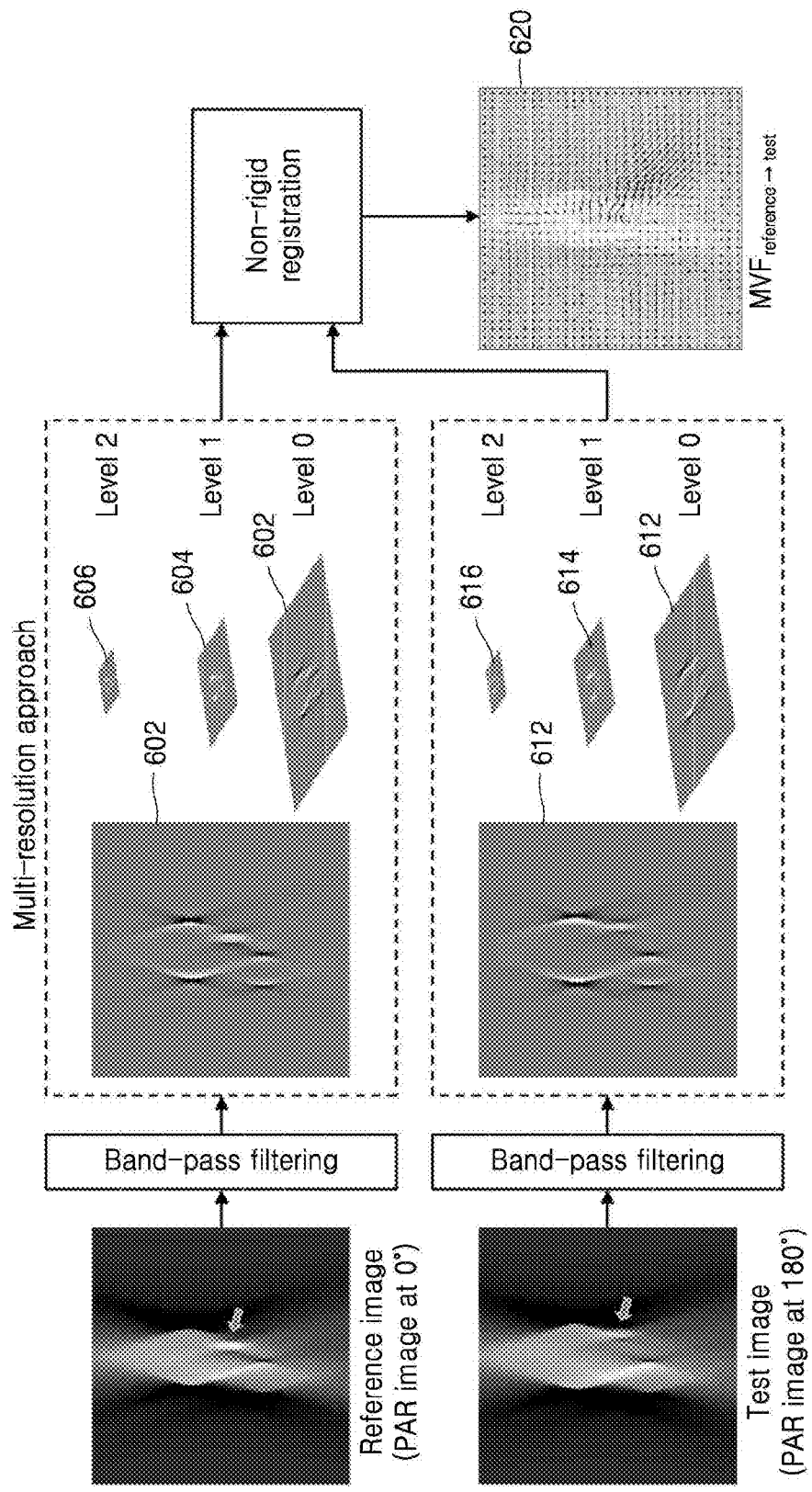
FIG. 6 illustrates a process of calculating an MVF from a partial angle reconstruction (PAR) image, according to an embodiment.

FIG. 6 illustrates a process of calculating an MVF from a PAR image, according to an embodiment.

According to an embodiment, before a motion is estimated using PAR images, band-pass filtering (BPF) is performed so that the characteristics of an image are changed so as to be suitable for motion estimation. As shown in FIG. 6, shading occurs in a projection direction, near an object having a high contrast ratio in a PAR image, and the shading affects the intensity of another object which is near the object having a high contrast ratio, thereby degrading the accuracy of motion estimation. Because the shading is basically a low frequency component and a feature used in motion estimation is a specific high frequency component, the present embodiment increases the accuracy of motion estimation by performing BPF on a PAR image. A band pass filter may be implemented by, for example, the processor 210.

According to an embodiment, a multi-resolution approach is used to enhance robustness of motion estimation. In other words, an image of a low resolution is created by blurring and down-sampling the original PAR stack, thereby performing motion estimation. When a motion vector estimated at this time is used as an initial value to estimate a motion of a higher resolution, the accuracy of motion estimation is increased.

The processor 210 may generate an MVF 620 ranging from a reference angle (0°) to a test angle (180°) by comparing first multi-resolution PAR images 602, 604, and 606 with second multi-resolution PAR images 612, 614, and 616.

Next, a motion estimation process will be described. First, initial motion estimation will be described.

According to an embodiment, the processor 210 uses a B-spline-based 4D freeform deformation (FFD) model as a motion model in order to express a motion of a heart over time. With respect to a 4D image sequence, the 4D FFD model represents correspondence between a reference image at a reference time point r and an image at each time point. A transform function of the 4D FFD model is expressed in Equation 1.

$$T_{r,i}(x;\Theta) = x + \sum_{t}\sum_{j}\beta\left(\frac{\phi_i}{d_\phi}-t\right)B\left(\frac{x}{d_s}-j\right)\Theta_{t,j} \quad [\text{Equation 1}]$$

In Equation 1, β indicates a 1D cubic B-spline, and B indicates a 3D tensor product of the 1D cubic B-spline. Φi corresponds to a center viewing angle of a PAR image at a time point i. dϕ indicates an interval between control points in a temporal domain, and ds indicates an interval between control points in a spatial domain. θt,j indicates a displacement vector of a control point at a time point t and at a position j. Θ indicates a displacement vector set of a 4D control point set for representing a motion relationship between the reference time point r and each time point. A control point means a specific sample point from which a motion is to be estimated. The processor 210 estimates a motion vector at an arbitrary voxel x by interpolating motion vectors estimated at these specific sample points.

Next, the processor 210 calculates a difference between conjugate PAR images in each conjugate PAR stack.

According to an embodiment, the processor 210 determines a parameter of a 4D motion model such that the difference between conjugate PAR images in each conjugate PAR stack decreases. For example, the processor 210 defines the parameter of the 4D motion model such that a difference between the PAR images from scan ranges 401 and 407 decreases, and defines the parameter of the 4D motion model such that a difference between the PAR images from scan ranges 402 and 408 decreases. Because two PAR stacks used in motion estimation have the same modality, a dissimilarity metric D(θ) is defined based on a sum of squared differences (SSD), as in Equation 2.

$$D(\Theta) = \sum_x \|P_r(x) - P_1(T_{r,1}(x;\Theta))\|^2 + \quad [\text{Equation 2}]$$
$$\sum_x \|P_r(x) - P_{N_{PAR}}(T_{r,N_{PAR}}(x;\Theta))\|^2 +$$
$$\sum_{i=2}^{r-1}\sum_x \|P_i(T_{r,i}(x;\Theta)) - P_{i+r-1}(T_{r,i+r-1}(x;\Theta))\|^2.$$

In Equation 2, NPAR indicates the number of PAR stacks during a scan range of π, r indicates an index of a reference phase. Pi(x) indicates an i-th PAR image, and Pr(x) indicates a PAR image of the reference phase. The processor 210 minimizes an error between PAR stacks of all conjugate pairs.

Because the 4D FFD motion model has a high degree of freedom, a problem of estimating a motion parameter is ill-posed, and thus an embodiment uses a regularization term of penalizing a large difference between parameter values of spatio-temporally adjacent control points as shown in Equation 3.

$$R_1(\Theta) = \sum_t \sum_j \sum_{j' \in K_j} \|\theta_{t,j} - \theta_{t,j'}\|_2^2 + \sum_t \sum_{t' \in K_t} \sum_j \|\theta_{t,j} - \theta_{t',j}\|_2^2 \quad \text{[Equation 3]}$$

In Equation 3, $K_j$ indicates a set of neighboring indices in the space of a j-th control point, and $K_t$ indicates a set of neighboring indices in the time of a control point at a time point t.

According to an embodiment, the processor 210 updates the first MVF such that an MVF becomes 0 at a reference phase. Because an MVF may not be 0 at the reference phase because of the characteristics of 4D B-spline interpolation, an embodiment may define another regularization term for correcting that an MVF does not became 0 at the reference phase, as in Equation 4.

$$R_2(\Theta) = \sum_x \left\| T_{r,r}(x; \Theta)) - x \right\|_2^2 \quad \text{[Equation 4]}$$

The processor 210 defines a final cost function by using a previously defined data term (for example, Equation 2) and the two regularization terms (for example, Equation 3 and Equation 4) in Equation 5, and searches for a motion model parameter for minimizing the final cost function.

$$C(\Theta) = D(\Theta) + \lambda_1 R_1(\Theta) + \lambda_2 R_2(\Theta) \quad \text{[Equation 5]}$$

In Equation 5, $\lambda 1$ and $\lambda 2$ indicate regularization parameters.

According to an embodiment, a Gauss-Newton method is used to search for a motion model parameter for minimizing the pre-defined cost function.

According to an embodiment, the processor 210 performs additional updating on the first MVF, in order to obtain a more accurate motion model.

Because the first MVF is estimated using a conjugate PAR stack, the first MVF does not accurately represent a motion relationship continuously over time. According to an embodiment, to more accurately represent a motion relationship continuously over time, a new heart motion model is defined by adding a refining term to the previously estimated first MVF, as in Equation 6.

$$V_{r,i}(x; \Phi) = T_{r,i}(x; \Theta) + c_{r,i}(x; \Phi) \quad \text{[Equation 6]}$$

$$= T_{r,i}(x; \Theta) + \sum_t \sum_j \beta_c\left(\frac{\phi_i}{d_\phi} - t\right) B\left(\frac{x}{d_s} - j\right)\varphi_{t,j},$$

In Equation 6, $\beta C(t)$ may be defined by Equation 7:

$$\beta_c(t) = \beta(t) * \sum_{m=-\infty}^{\infty} \delta\left(t - \frac{180°}{d_\phi}m\right). \quad \text{[Equation 7]}$$

In Equation 7, $\Phi$ indicates a set $\varphi t,j$ of displacement vectors of control points, and $\beta C$ is a repetition of $\beta$ at intervals of 180° and enables an MVF to be created by re-using a control point at intervals of 180°.

Next, the processor 210 performs additional updating with respect to the first MVF by using an energy function.

The processor 210 uses IP to estimate a refining term. The IP is an image metric according to an embodiment. The IP may be induced by applying a Parzen's windowing technique to Renyi's quadratic entropy, and may quantify motion artifacts existing within an image as in general Shannon entropy. The IP is defined by Equation 8.

$$H(\Phi) = \frac{1}{N^2} \sum_{x_1} \sum_{x_2} G_{\sqrt{2}\,\sigma}(I_{MC}(x_1; \Phi) - I_{MC}(x_2; \Phi)) \quad \text{[Equation 8]}$$

In Equation 8, $G\sigma$ indicates a Gaussian distribution having a standard deviation of $\sigma$, and N indicates the total number of voxels of IMC. The IP is defined in a simpler formula, as compared with Shannon entropy, and, because a parameter, such as a bin size or an interval, does not need to be determined, the IP is easy to handle during optimization.

Similar to the above description, because the 4D FFD model has a high degree of freedom, a problem of estimating a parameter is ill-posed. According to an embodiment, to address this problem, the processor 210 may use Equation 9 as a regularization term such that a difference between spatially adjacent control points does not increase.

$$R_1(\Phi) = \sum_t \sum_j \sum_{k \in K_j} \|\varphi_{t,j} - \varphi_{t,k}\|_2^2 \quad \text{[Equation 9]}$$

According to the present embodiment, a regularization term is used that prevents a currently estimated MVF from being greatly changed from the first MVF and prevents a shape change due to a great change in MVF. A regularization term represented by Equation 10 may cause a refining term to be 0.

$$R_2(\Phi) = \sum_t \sum_j \|\varphi_{t,j}\|_2^2 \quad \text{[Equation 10]}$$

An energy function for estimating a motion model may be defined as subtracting the two regularization terms from the IP.

$$E(\Phi) = H(\Phi) - \lambda_1 R_1(\Phi) - \lambda_2 R_2(\Phi) \quad \text{[Equation 11]}$$

The processor 210 obtains an improved MVF to maximize the pre-defined energy function and combines the improved MVF with the first MVF, thereby calculating the second MVF.

Figure 7:
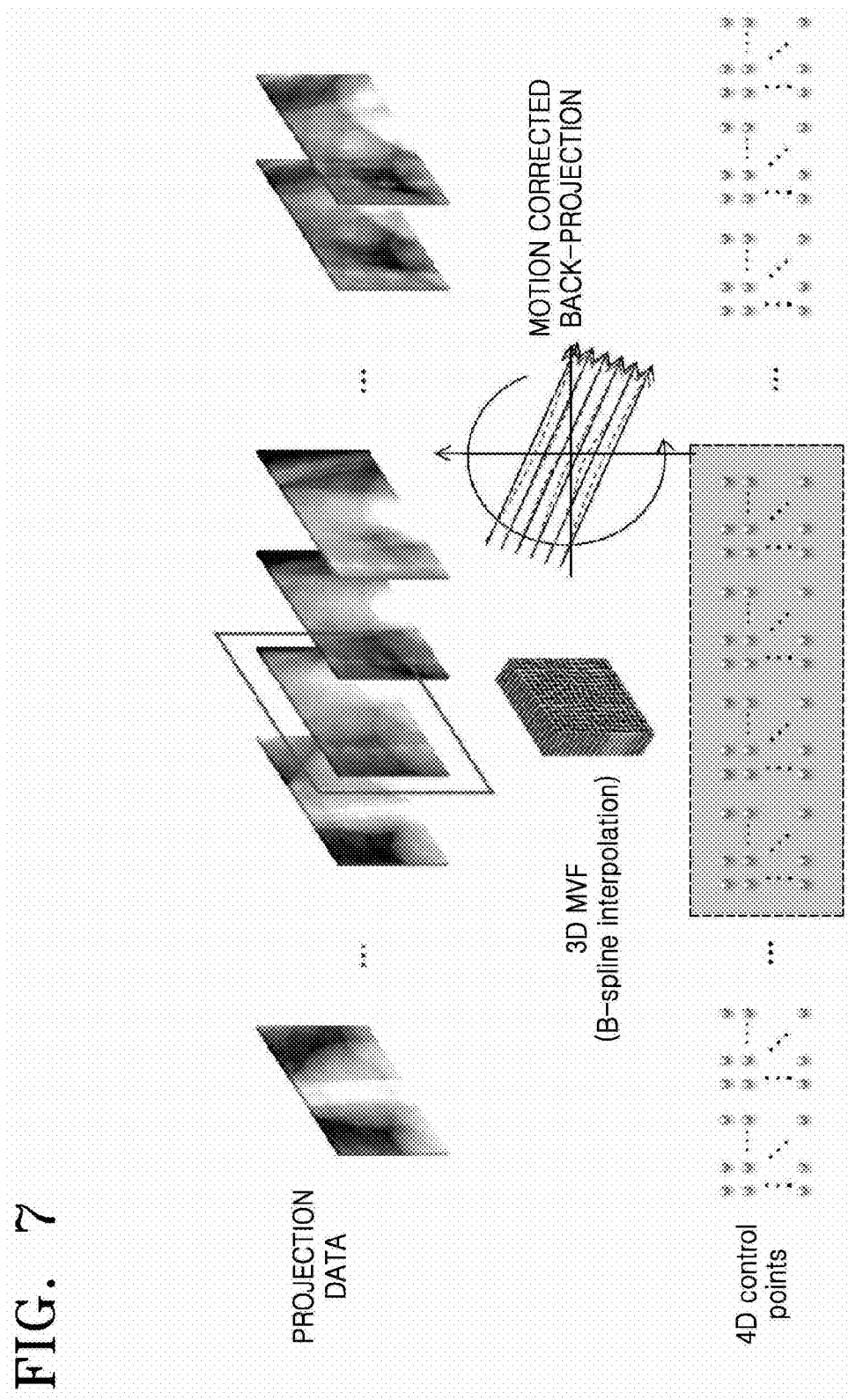
FIG. 7 illustrates a process of generating a motion-compensated reconstructed image, according to an embodiment.

FIG. 7 illustrates a process of generating a motion-compensated reconstructed image, according to an embodiment.

According to an embodiment, to obtain a motion-compensated image by using an estimated 4D motion model, motion compensation is performed by referring to a Schafer's method, based on a weighted filtered back projection (WFBP) method. In the WFBP method, back projection is performed by rebinning projection data acquired using a fan beam to a parallel-beam and applying different weights to different cone angles. In the Schafer's method, when a certain object has a motion and a motion vector is given, back projection is performed by reflecting the motion vector (warping rays) during back projection, in order to restore the object. The processor 210 performs motion compensation by generating an MVF ranging from a target time point to a time point of each view and then warping rays using the MVF when back-projecting a corresponding view. In other words, the processor 210 performs motion compensation by warping rays of a sinogram during image reconstruction. The processor 210 may perform 4D B-spline interpolation for each view as shown in FIG. 7, in order to obtain a 4D motion model.

Next, a 3D motion estimation and compensation algorithm for a standard-pitch helical scan according to another embodiment will be described.

According to the present embodiment, a motion artifact-reduced 3D image of the entire heart is obtained in a standard pitch helical scan environment. First, consecutive PAR images are produced using an obtained sinogram. Thereafter, an intermediate frequency is extracted, and then initial motion estimation is performed to minimize an error to each PAR image pair. All PAR images are warped to a virtual reference time point by using the first MVF as an initial MVF such that images having a difference of 180° are collected to the same virtual phase. Thereafter, a refining term is estimated by performing the IP maximization described above in the embodiment regarding a low-pitch helical scan with respect to a produced PAR stack, and then a motion-compensated image is reconstructed using an estimated MVF.

Figure 8:
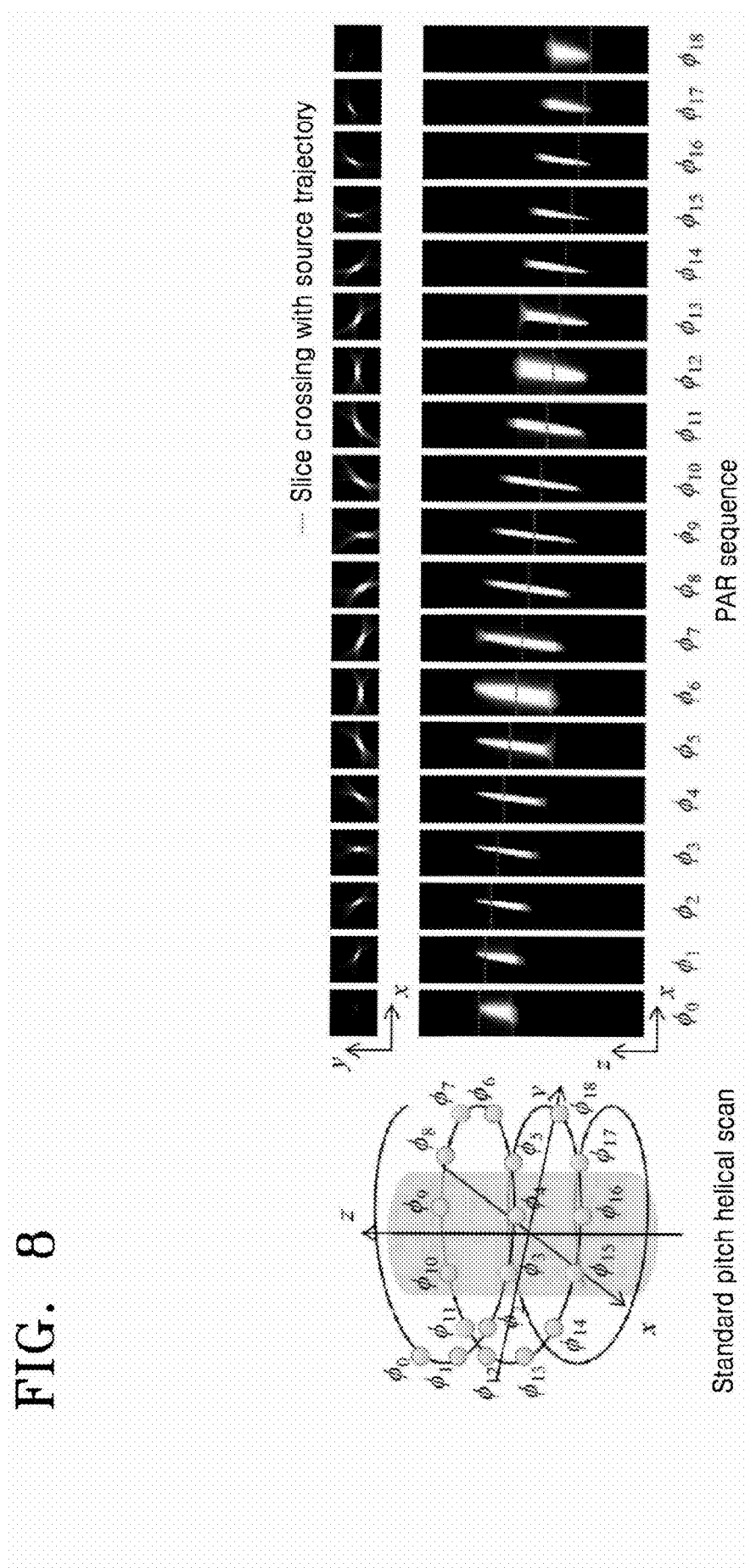
FIG. 8 illustrates a PAR sequence according to an embodiment.

FIG. 8 illustrates a PAR sequence according to an embodiment.

According to an embodiment, the processor 210 generates a PAR sequence by using projection data in a scan section that is less than a short scan section for motion estimation, as shown in FIG. 8. Because a data obtainment condition is a standard-pitch helical scan, a target phase that covers all PAR images in a z-axis does not exist, and a single PAR image exists for a single phase. According to an embodiment, the processor 210 may calculate an MVF from a pair of PAR images corresponding to angular sections that face each other. For example, because PAR images having a difference of 180° therebetween correspond to overlapping regions, and have limited view angle artifacts of the same pattern, the PAR images may be used in motion estimation.

Next, initial motion estimation will be described. According to an embodiment, to estimate an initial motion model, a motion of a heart over time is expressed based on the B-spline-based 4D FFD model. A transform function is expressed in Equation 12.

$$T_{r,i}(x; \Theta) = x + a_i(z) \sum_t \sum_j \beta\left(\frac{\phi_i}{d_\phi} - t\right) B\left(\frac{x}{d_s} - j\right) \theta_{t,j} \quad \text{[Equation 12]}$$

In Equation 12, $a_i(z)$ is a weight function that causes an MVF at the location of a z slice to be 0 at a phase corresponding to a source location that intersects with the z slice. This transform function enables reference phases of z slices to be defined differently, and enables each z slice to have a motion estimated by using conjugate PAR images, and compensation for the estimated motion is based on the temporal location of each z slice.

As described above with regard to motion estimation, BPF is used to increase the accuracy of matching between conjugate PAR images. Thereafter, a motion model parameter is estimated such that an SSD between conjugate PAR image pairs decreases.

$$D(\Theta) = \sum_t \sum_x \|P_i(T_{r,i}(x; \Theta)) - P_{i+N_\pi}(T_{r,i+N_\pi}(x; \Theta))\|^2. \quad \text{[Equation 13]}$$

In Equation 13, $N\pi$ indicates the number of PAR images within a section of 180°. Because estimating a motion model parameter is an ill-posed problem, regularization for preventing an excessive increase in a difference between the values of spatio-temporally adjacent motion model parameters, as shown in Equation 14, is used.

$$R(\Theta) = \quad \text{[Equation 14]}$$
$$\sum_t \sum_j \sum_{j' \in K_j} \|\theta_{t,j} - \theta_{t,j'}\|_2^2 + \sum_t \sum_{t' \in K_t} \sum_j \|\theta_{t,j} - \theta_{t',j}\|_2^2$$

An optimization process for the two above equations 13 and 14 is conducted based on the Gauss-Newton method and an optimization transfer method, the same as described above.

Next, PAR images may be stacked before IP maximization is performed based on a result of the initial motion estimation, thereby increasing the efficiency of processing. According to the present embodiment, in contrast with the above-described embodiment of collecting and processing PAR images belonging to the same phase, PAR images having an angle of 180×n+ϕ as a center viewing angle are warped based on the first MVF and stacked. In the standard-pitch helical scan environment, images belonging to the same phase may not be collected because only a single cycle is used, and instead images having a difference of 180° therebetween may be warped by using information of the first MVF, and thus the images are created to belong to the same virtual phase and are stacked.

Also in the embodiment of the standard-pitch helical scan, as described above, a refining term is defined as in Equation 15, in order to improve a result of the initial motion estimation.

$$V_{r,i}(x; \Phi) = \quad \text{[Equation 15]}$$
$$x + c_{r,i}(x; \Phi) = x + \sum_t \sum_j \beta_c\left(\frac{\phi_i}{d_\phi} - t\right) B\left(\frac{x}{d_s} - j\right) \varphi_{t,j}.$$

Next, the processor 210 performs motion estimation, based on local IP, by Equation 16 capable of quantifying the quality of a motion-compensated image.

$$H(\Phi) = \quad \text{[Equation 16]}$$
$$\sum_x \frac{1}{N_{W_x}^2} \sum_{x_1 \in W_x} \sum_{x_2 \in W_x} G_{\sigma\sqrt{2}}(I_{MC}(x_1; \Phi) - I_{MC}(x_2; \Phi))$$

In Equation 16, a summed image IMC is generated by applying an MVF to a PAR stack and warping and summing all PAR images. An MVF initially used in this process is the first MVF, and thereafter an iteratively updated MVF is used to thereby iteratively obtain the summed image IMC. An image metric H($\Phi$) is iteratively calculated from the summed image IMC, and thus the first MVF is updated such that the image metric H($\Phi$) decreases. The image metric H($\Phi$) according to Equation 16 is a value that quantitatively represents motion artifacts, based on a histogram distribution of the summed image IMC. A final motion-compensated image is obtained by applying, to raw data (projection data or a sinogram), the second MVF which is a final MVF generated via iterative updating.

Because the 4D B-spline FFD model is ill-posed, a regularization term such as that of Equation 17 is used such that the values of spatially adjacent motion mode parameters become similar to each other.

$$R_1(\Phi) = \sum_t \sum_j \sum_{k \in K_j} \|\varphi_{t,j} - \varphi_{t,k}\|_2^2 \quad \text{[Equation 17]}$$

Because the processor 210 uses IP maximization, another regularization term for enabling an ideal image at an arbitrary time point to be similar to an initial motion-compensated image after being warped based on a current MVF for shape preserving, such as that of Equation 18, is additionally used.

$$R_2(\Phi) = \sum_i \sum_x \|I_{\phi_i}(V_{\phi_i}(x;\Phi)) - I_{MC}(x;\Phi=0)\|_2^2 \quad \text{[Equation 18]}$$

An energy function of Equation 19 may be defined using the IP and the two regularization terms.

$$E(\Phi) = H(\Phi) + R_1(\Phi) + R_2(\Phi) \quad \text{[Equation 19]}$$

The IP and the first regularization term obtain an optimal value by using the Gauss-Newton, similar to the low-pitch helical scan.

Similar to the above-described low-pitch helical scan, the present embodiment implements motion compensation reconstruction by using the Schafer's method, based on the WFBP reconstruction algorithm. However, in contrast with the low-pitch helical scan algorithm in which a motion model is used according to a summing method, the standard-pitch helical scan algorithm uses a motion model according to a cascading method as follows.

In the cascading method, estimation needs to start from the coordinate of a final image. First, because the final image is obtained via accurate motion estimation, a refining motion model is considered as shown in Equation 20.

$$x' = V_{r,i}(x_{MC};\Phi) \quad \text{[Equation 20]}$$

In Equation 20, xMC indicates the coordinate of a final motion-compensated image. Thereafter, a coordinate transformation for generating a motion-compensated PAR stack from obtained data is considered as shown in Equation 21 below.

$$x'' = T_{r,i}(x';\Theta) \quad \text{[Equation 21]}$$

According to the present embodiment, a motion compensation amount that is finally generated for motion compensation is expressed by Equation 22.

$$m(x_{MC}) = T_{r,i}(V_{r,i}(x_{MC};\Phi);\Theta) - x_{MC} \quad \text{[Equation 22]}$$

The processor 210 performs motion compensation by using the calculated motion compensation amount, via the above-described warping method or via bi-linear interpolation using a pre-calculated MVF set.

The present disclosure provides embodiments of compensating for image quality degradation due to a motion that is generated when X-ray CT is used to obtain a heart image. Although embodiments regarding a heart have been focused on and described above, embodiments of the present disclosure are not limited to the heart, and the target of the present disclosure may be various body organs or parts thereof.

Embodiments of the present disclosure provide a 4D ME/MC algorithm capable of obtaining an image of improved quality by using an IP maximization method, which is a new motion estimation method, based on a PAR image-based 4D ME/MC algorithm. The IP maximization method enables motion estimation and compensation with respect to the entire region of an image and does not require additional processing for ROI extraction, in contrast to an MAM optimization method in which a motion that optimizes an entropy-based image metric is obtained and used in image reconstruction. Moreover, the IP maximization method is easily handled during optimization, because the IP is defined in a simpler formula as compared with Shannon entropy.

Embodiments of the present disclosure also provide an algorithm for estimating and compensating for a motion in the standard-pitch helical scan environment. According to embodiments of the present disclosure, initial motion estimation is performed by using filtered PAR images such that an error between conjugate PAR images having a difference of 180° decreases, and IP maximization is performed based on a result of the initial motion estimation, thereby obtaining a final motion estimation result. As described above, according to embodiments of the present disclosure, a motion of the entire region of an image may be estimated and compensated for, and additional processing is not necessary. According to embodiments of the present disclosure, because only data of a single cycle is used, a user does not need to consider mismatching between heart motion cycles nor the inconvenience of having to maintain a constant breathing state between cycles. Embodiments of the present disclosure are expected to open a new chapter in heart diagnosis by obtaining an image according to a new method.

According to embodiments of the present disclosure, medical image processing methods and medical image processing apparatuses that more accurately represent a motion relationship between adjacent times are provided.

According to embodiments of the present disclosure, medical image processing methods and medical image processing apparatuses capable of reducing a scan time and increasing a scan pitch to thereby obtain an inter-cyclic motion artifact-reduced 3D image are provided.

The above-described embodiments of the present disclosure may be embodied in form of a computer-readable recording medium for storing computer executable command languages and data. The command languages may be stored in form of program codes and, when executed by a processor, may perform a certain operation by generating a certain program module. Also, when executed by a processor, the command languages may perform certain operations of the disclosed embodiments.

While embodiments of the present disclosure have been particularly shown and described with reference to the accompanying drawings, it will be understood by those of ordinary skill in the art that various changes in form and details may be made therein without departing from the spirit and scope of the invention as defined by the appended claims. The disclosed embodiments should be considered in descriptive sense only and not for purposes of limitation.

What is claimed is:

1. A medical image processing apparatus comprising:
a processor configured to:
obtain raw data in a first phase section;
generate first motion information by using at least one partial angle reconstruction (PAR) image pair including two PAR images respectively obtained in two phase sections in the first phase section that face each other;
generate a summed image by summing a plurality of PAR images obtained at different phases within the first phase section by using the first motion information;
generate second motion information by updating the first motion information such that an image metric representing motion artifacts is minimized when being calculated from the summed image; and
generate a reconstructed image by applying the second motion information to the raw data.

2. The medical image processing apparatus of claim 1, wherein each of the at least one PAR image pair comprises two PAR images having a phase difference of 180° therebetween.

3. The medical image processing apparatus of claim 1, wherein the processor is further configured to update the first motion information such that a difference between pieces of motion information of spatially adjacent control points decreases.

4. The medical image processing apparatus of claim 1, wherein the processor is further configured to update the first motion information such that motion information at a reference phase is zero.

5. The medical image processing apparatus of claim 1, wherein the processor is configured to warp rays of the raw data, based on the second motion information, when the reconstructed image is generated.

6. The medical image processing apparatus of claim 1, wherein the first phase section is a phase section having an angle greater than 180°.

7. The medical image processing apparatus of claim 1, wherein each of the two phase sections that face each other has an angle greater than 0° and less than 180°.

8. The medical image processing apparatus of claim 1, wherein the processor is configured to generate a PAR stack by summing a plurality of PAR images belonging to a same phase, based on a location where a source performs projection, and to generate the first motion information by using a PAR stack pair in the two phase sections that face each other.

9. The medical image processing apparatus of claim 1, wherein the processor is configured to generate the summed image by compensating for a motion by applying the first motion information to the plurality of PAR images obtained at the different phases and by summing a plurality of motion-compensated PAR images obtained by performing the motion compensation on the plurality of PAR images.

10. A medical image processing method comprising:
obtaining raw data in a first phase section;
generating first motion information by using at least one partial angle reconstruction (PAR) image pair including two PAR images respectively obtained in two phase sections that face each other in the first phase section;
generating a summed image by summing a plurality of PAR images obtained at different phases within the first phase section by using the first motion information;
generating second motion information by updating the first motion information such that an image metric representing motion artifacts is minimized when being calculated from the summed image; and
generating a reconstructed image by applying the second motion information to the raw data.

11. The medical image processing method of claim 10, wherein each of the at least one PAR image pair comprises two PAR images having a phase difference of 180° therebetween.

12. The medical image processing method of claim 10, further comprising updating the first motion information such that a difference between pieces of motion information of spatially adjacent control points decreases.

13. The medical image processing method of claim 10, further comprising updating the first motion information such that motion information at a reference phase is zero.

14. The medical image processing method of claim 10, wherein the generating the reconstructed image comprises warping rays of the raw data, based on the second motion information.

15. The medical image processing method of claim 10, wherein the first phase section is a phase section that has an angle greater than 180°.

16. The medical image processing method of claim 10, wherein each of the two phase sections that face each other have an angle greater than 0° and less than 180°.

17. The medical image processing method of claim 10, further comprising generating a PAR stack by summing a plurality of PAR images belonging to a same phase, based on a location where a source performs projection,
wherein the generating the first motion information comprises generating the first motion information by using a PAR stack pair in the two phase sections that face each other.

18. The medical image processing method of claim 10, wherein the summed image is generated by compensating for a motion by applying the first motion information to the plurality of PAR images obtained at the different phases and by summing a plurality of motion-compensated PAR images obtained by performing the motion compensation on the plurality of PAR images.

19. A computer program product comprising a non-transitory computer-readable recording medium having recorded thereon computer program codes which, when derived and executed by a processor, perform a medical image processing method comprising:
obtaining raw data in a first phase section;
generating first motion information by using at least one partial angle reconstruction (PAR) image pair including two PAR images respectively obtained in two phase sections that face each other in the first phase section;
generating a summed image by summing a plurality of PAR images obtained at different phases within the first phase section by using the first motion information;
generating second motion information by updating the first motion information such that an image metric representing motion artifacts is minimized when being calculated from the summed image; and
generating a reconstructed image by applying the second motion information to the raw data.

20. The computer program product claim 19, wherein the method further comprises generating a PAR stack by summing a plurality of PAR images belonging to a same phase, based on a location where a source performs projection,
   wherein the generating the first motion information comprises generating the first motion information by using a PAR stack pair in the two phase sections that face each other.

* * * * *